United States Patent [19]

Medina

[11] Patent Number: 4,945,408
[45] Date of Patent: Jul. 31, 1990

[54] THREE DIMENSIONAL STEREOSCOPIC VIDEO SYSTEM WITH A SINGLE IMAGE SENSOR

[76] Inventor: Antonio Medina, P.O. Box 1002, Pasadena, Calif. 91102

[21] Appl. No.: 232,424

[22] Filed: Aug. 15, 1988

Related U.S. Application Data

[63] Continuation-in-part of Ser. No. 66,497, Jun. 26, 1987.

[51] Int. Cl.⁵ .............................................. H04N 13/00
[52] U.S. Cl. ........................................ 358/88; 358/89
[58] Field of Search ....................... 358/88, 89, 90, 91, 358/92, 3; 356/1–6; 364/522

[56] References Cited

U.S. PATENT DOCUMENTS

| | | |
|---|---|---|
| 3,534,164 | 10/1970 | Glenn, Jr. .............................. 358/89 |
| 3,682,553 | 8/1972 | Kapany ............................... 358/88 X |
| 3,860,752 | 1/1978 | Adler et al. ........................ 358/88 X |
| 3,952,308 | 4/1976 | Lammers ......................... 364/522 X |
| 4,654,699 | 3/1987 | Medina ................................... 358/88 |
| 4,714,319 | 12/1987 | Zeevi et al. ........................ 358/89 X |

Primary Examiner—Howard W. Britton
Assistant Examiner—Victor R. Kostak
Attorney, Agent, or Firm—Wolf, Greenfield & Sacks

[57] ABSTRACT

A three dimensional display system in which a beam of energy is admitted from a single source with the beam reciprocally scanning an object. The reflected energy from the beam is detected and the reflected energy is separated and segregated by the direction of the scan. The two separately detected signals are then displayed separately to each eye of the viewer to create a stereoscopic image.

10 Claims, 4 Drawing Sheets

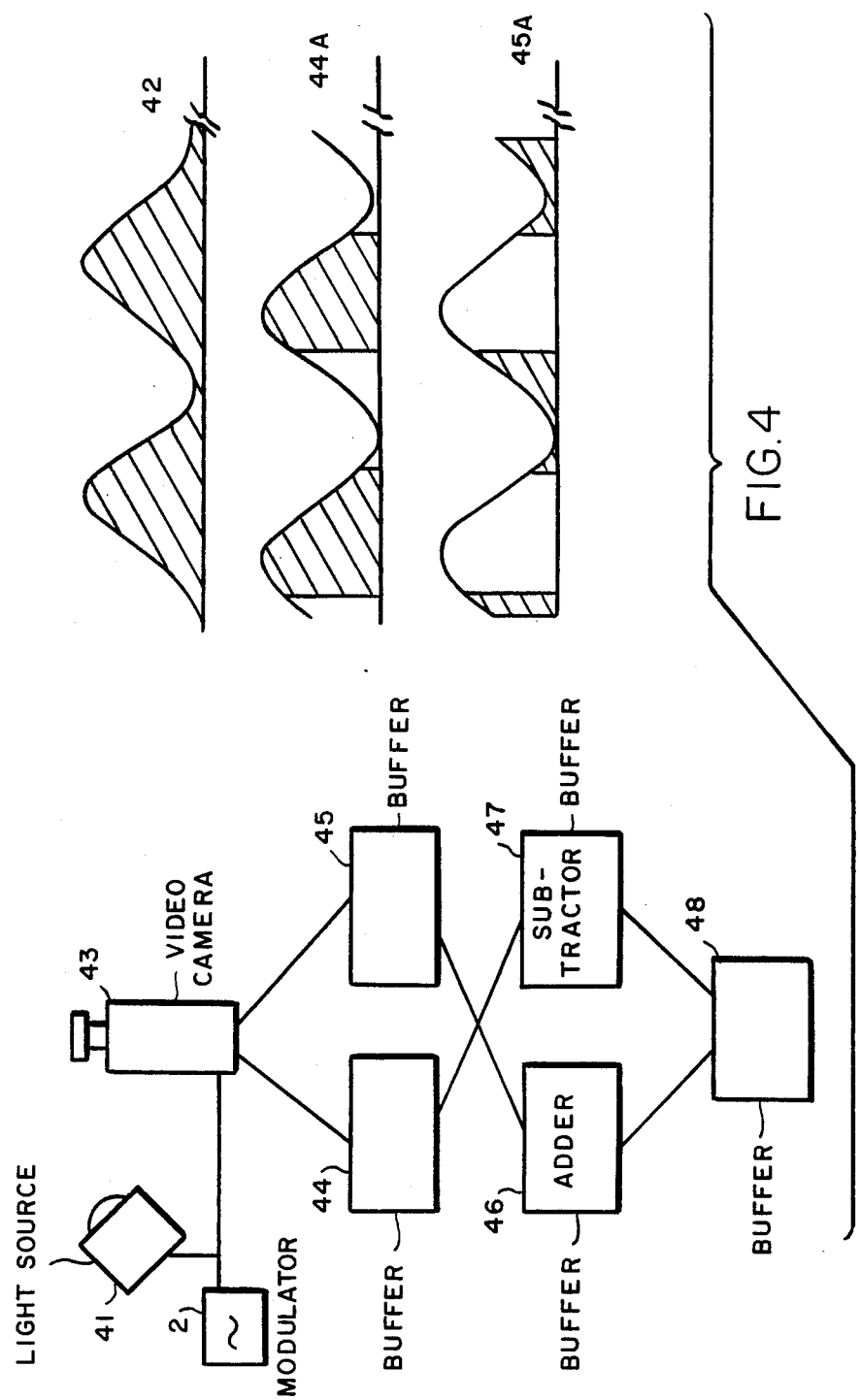

THREE DIMENSIONAL STEREOSCOPIC VIDEO SYSTEM WITH A SINGLE IMAGE SENSOR

PRIOR APPLICATIONS

This is a continuation-in-part of Ser. No. 066,497 filed June 26, 1987.

SUBJECT MATTER OF INVENTION

The present invention relates to means for recording and displaying three-dimensional images by a system which utilizes one energy source and one energy detector.

BACKGROUND OF INVENTION

Prior art 3-dimensional displays rely on systems which capture two different images from two locations and presenting each image to each eye by means of well known devices such as stereoviewers or stereoscopes.

Most recently, the recording of two stereoscopically related images from a single point in space, but requiring two separated scanning beams to illuminate the scene, was described in application Ser. No. 537,514 filed Sept. 30, 1983.

Additionally, two dimensional video images of an object or a scene have been effected without using a camera. In such a system, the object is illuminated by scanning light, such as a laser beam, which moves over the scene in a raster similar to the movement of an electron beam in a CRT. The light from the laser beam reflected by the scene is picked up by a photomultiplier which controls the beam intensity of a cathode ray tube of a video monitor. Thus, as the laser beam scans the object the photomultiplier senses variations in the reflected light and generates an analog output which is coupled to the gun of the cathode ray tube of the video monitor. The movement of the electron beam emanating from the gun of the cathode ray tube is synchronized with the movement of the laser beam. Such systems are useful for generating two dimensional images on a monitor and have been used in the inspection of nuclear reactors and in scanning laser ophthalmoscopes. However, to date such systems have not been useful or adaptable for three dimensional displays.

In addition to such systems numerous efforts have been made to create a wide range of three dimensional imaging systems. Some of these systems have been described in a number of issued U.S. patents, including U.S. Pat. Nos. 1,372,646; 1,595,295; 2,235,743; 2,360,322; 2,568,327; 2,751,826; 3,039,358; 3,731,606; 3,810,213; 3,990,087; 4,009,951; 4,189,210; 4,290,675; and 3,431,299.

OBJECTS AND SUMMARY OF INVENTION

It is an object of the present invention to provide a novel system for generating three dimensional images as standard stereo pairs which may utilize an energy source selected from a wide frequency spectrum. Thus, the present invention is designed to generate three dimensional images utilizing visible light waves or other wave lengths such as infrared or ultraviolet, with a suitable detector. Additionally, the present invention is designed for use with other types of radiation sources different from electromagnetic waves such as x-rays or ultrasound.

A further object of the present invention is to provide a means for generating standard stereo pairs of images of an object, making use of an energy sensitive means, which generates a pair of signals which may be appropriately channelled for stereoscopic viewing.

A further object of the present invention is to provide an improved means for generating three dimensional images without the use of a pair of cameras and by means which may be adaptable for use in a variety of systems and for a variety of purposes.

A still further object of this invention is to provide an improved means and method that may be adopted for generating three dimensional images in video broadcasting or recording, video monitoring, and surveillance and reconnaissance systems.

The present invention provides an improved means for generating standard stereo pairs of images which may be detected and transmitted either in analog or digital form.

In the present invention 3-dimensional information of a scene is obtained by means of a single energy source such as a light source, and by means that differentiate the relative distance of objects in the scene as a function of the different time required by the energy to reach the object, reflect and reach the detector means.

In this invention an energy source used in conjunction with an energy sensor and suitably modified video equipment, renders 3-dimensional stereoscopic images when viewed with known stereo-viewing devices. One embodiment of the present invention consists of a scanning energy source such as a laser beam that scans a scene in the same way and in synchrony, as the raster beam in a CRT (Cathod Ray Tube), except that horizontal lines are scanned from right to left, left to right, right to left and so on instead of always in the same direction (right to left). The electron beam in the CRT is also made to scan the screen in synchrony in the same right-left-right . . . fashion. In this scanning sequence, the energy reflected from a far object is delayed, and therefore presented on the CRT screen more to the right of a nearer object when scanning from left to right and more to the left when scanning in the opposite direction. The horizontal displacement of the object on the CRT screen is equal to the velocity of the raster on the CRT screen multiplied by the extra time required by the energy to travel the extra distance and back. This time is equal to the relative depth of the object divided by the velocity of the illuminating energy beam.

In a second embodiment, the whole scene is illuminated uniformly with an energy by means such as a flood light, but the intensity of the energy is changed periodically, by suitable means such as a gas tube powered with alternating current. The phase of the reflected energy is a function of the distance of the reflecting object. Detecting the phase of such energy can be accomplished with a conventional phase detector applied to the reflected energy once converted to electrical energy or video signal by means of a conventional video camera.

If the output of the phase detector is used to shift the electron beam of a CRT, objects that are further in space will be shifted more than near ones. This is the same result as when viewing the scene with either eye (stereoscopic disparity). Therefore, if two images, shifted by different amounts (opposite phase), are presented separately to each eye, a sensation of stereoscopic depth arises.

BRIEF DESCRIPTION OF THE DRAWINGS

FIG. 4 illustrates a preferred method for detection of phase (depth) for the arrangement illustrated in FIG. 3.

DETAILED DESCRIPTION OF THE INVENTION

Figure 1A:
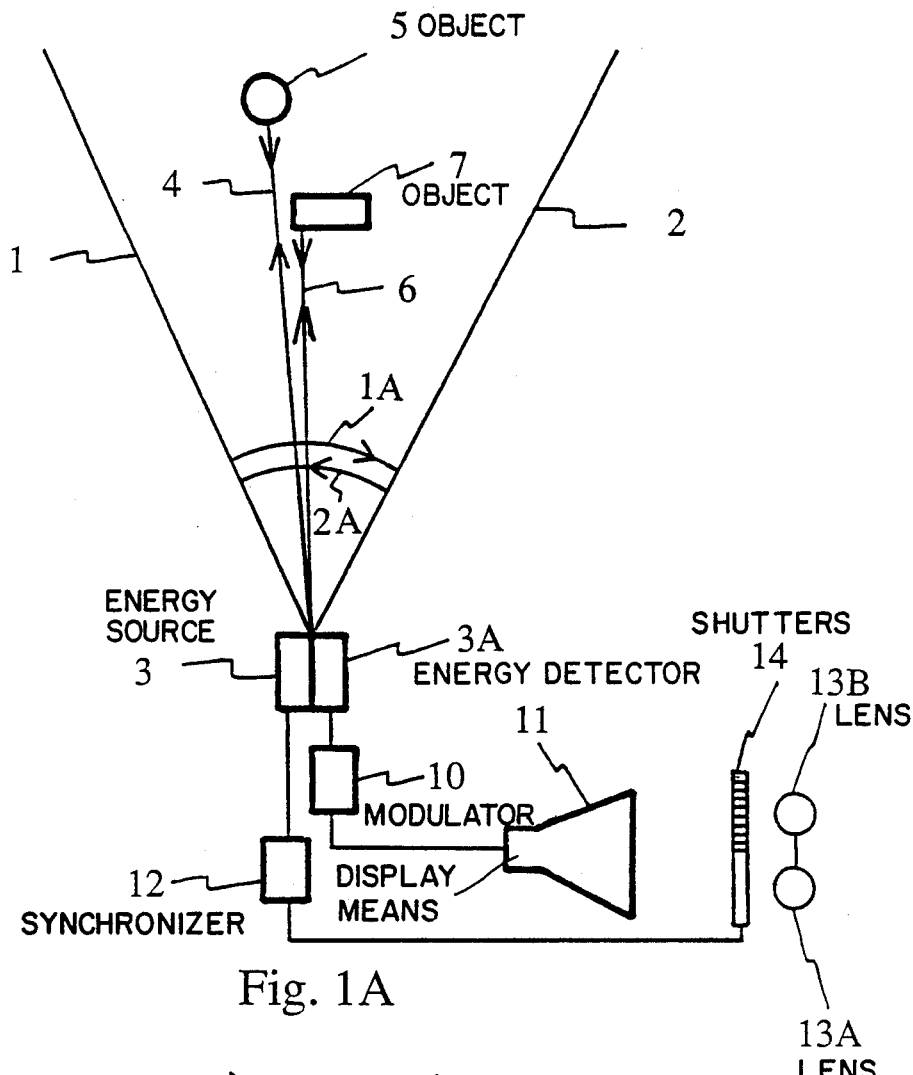
FIGS. 1A and 1B are schematic top view of an embodiment of the present invention using a beam of energy scanning a scene in both directions alternately with images displayed on a screen for each direction of raster movement.
Figure 1B:
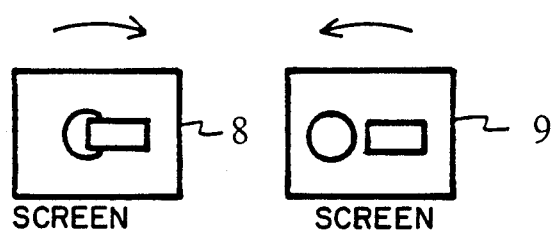

FIG. 1 illustrates the operation of one embodiment of the present invention. A beam of energy from energy source 3 scans a scene or objects 5 and 7 two dimensionally. The beam scans horizontally from left position 1 to right position 2, then from position 2 to position 1 on a lower scanning line or position and then from 2 to 1 again one scanning line lower and so on until the desired vertical field is scanned. The scanning sequence is illustrated by arrows A and B, with arrow B representing a scan line lower than arrow A. The scanning beam energy emanating from source 3 will hit the objects to be imaged and the energy will be reflected and will travel back to source 3 where a suitable energy detector 3A for such energy is located. The time required for the beam when in position 4 to travel to an object 5 and back will be longer than the time required by the beam when in position 6 to hit a point of object 7 and reflect back to the detector 3A since object 5 is more distant from object 7. The detector output signal from detector 3A modulates the intensity of a CRT electron beam moving in the same way and in synchrony with the beam of energy from source 3. As schematically illustrated, the output from detector 3A is fed through a modulator 10 to modulate the energy signal in the display means 11 which in this example is a cathode ray tube. The intensity of the reciprocating electron beam scan in the cathode ray tube 11 is thus varied by the modulator synchronously with the beam scanning from energy source 3. That beam is scanned in synchronous movement with the output energy from energy source 3 by suitable means such as synchronizer 12. Stereo pairs are detectable to an observer by segregating one by a variety of known techniques. For example, a pair of spectacles having alternating shutters for the lenses 12 and 13 may be provided. The shutters schematically illustrated at 14 are controlled for alternate covering of lenses 12 and 13 in synchronism with the output from detector 3A by synchronizer 12.

The CRT screen 11 thus presents to the observer two separate pictures, one to each eye of the observer, with the images illustrated in FIG. 1A as noted, different pictures depend from source 3 on the direction of movement of the raster: 8 when scanning from left to right and 9 when scanning from right to left. Far objects will be shifted with respect to nearer objects in the direction of the scanning beam, either to the right as depicted in 8 or to the left as shown in 9, the shift being the consequence of the delay of arrival of the energy reflected further away. Screens 8 and 9 comprise a stereoscopic pair and will give rise to depth perception when each screen is presented to each eye (8 to right and 9 to left eye). The angle of disparity can be easily derived from this figure and found to be: Disparity=4dw/v where d is the relative distance between objects 5 and 7, w is the angular velocity of the raster and v the velocity of travel of the energy used.

Figure 2:
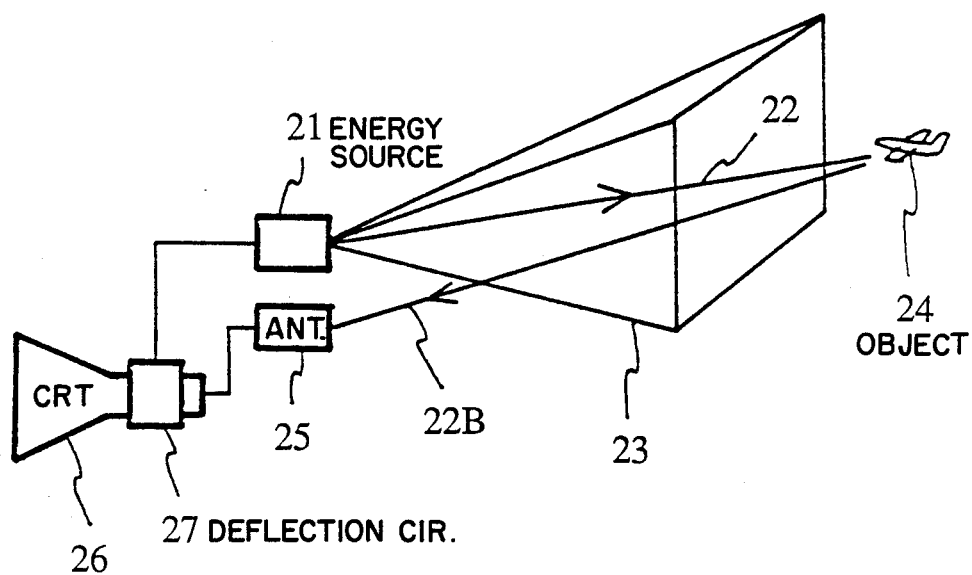
FIG. 2 depicts a schematic arrangement of the present invention using a scanning-beam to achieve a three-dimensional display in a radar station.

FIG. 2 illustrates an embodiment of the invention in which energy source 21 is a continuous-wave microwave scanning source, similar to those used in radar installations. A scanning beam 22 covers field 23 by scanning in a right-left-right fashion as described above in connection with FIG. 1. The beam of energy 22b reflected from an object 24 is detected by a microwave antenna 25. The signals detected by the antenna 25 is suitably amplified to control the electron beam intensity of CRT 26 while the deflection of such beam is controlled by deflection circuits 27 which are operated in synchrony with the deflection control 21 of the radar beam. The image on the screen of the CRT presents stereo pairs to an observer when the right and left scan are segregated and presented to each eye by conventional methods. These methods may include, as noted above, alternating shutter spectacles.

Figure 3:
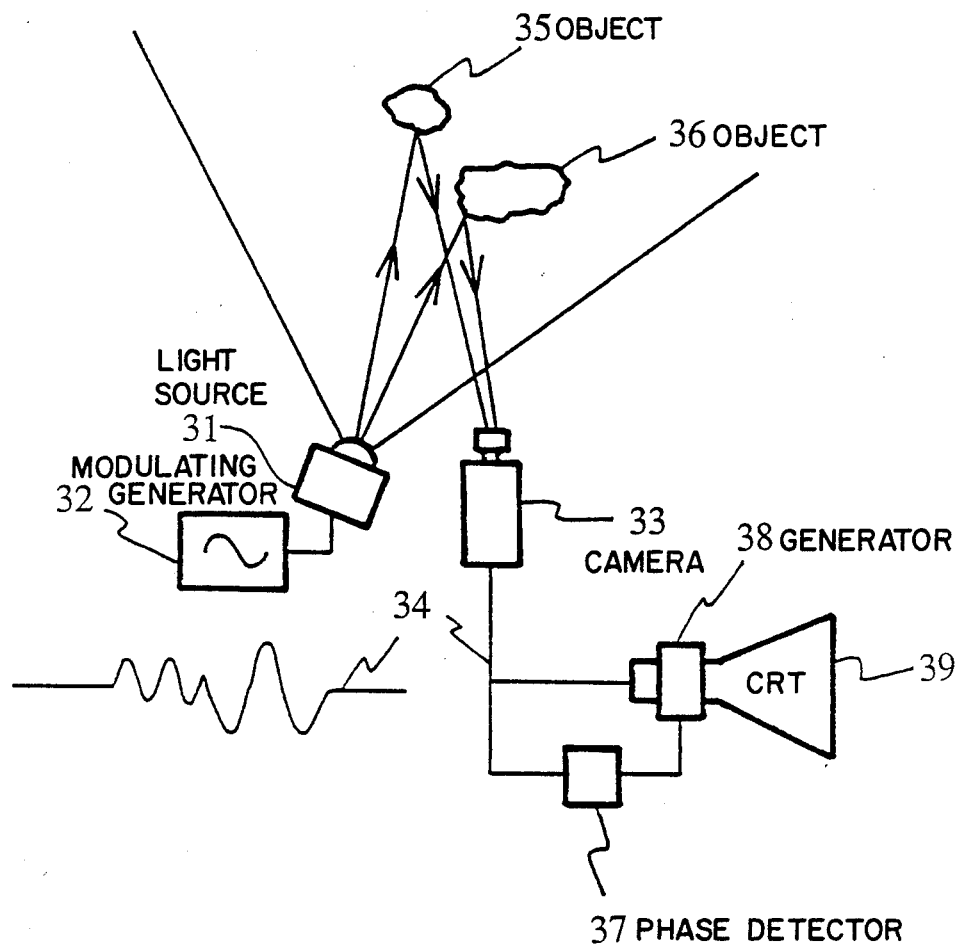
FIG. 3 illustrates the arrangement of components in an alternative form of the present invention using a conventional regular TV camera.

FIG. 3 depicts an alternative embodiment of the present invention for TV or video applications that does not require a scanning source. Instead, a flood light 31 is used whose intensity is modulated by a high frequency sinusoid generator 32. A detector means comprises a standard video camera 33 that generates a standard video signal 34 that is modulated by the sinewave generator 32. The phase of such modulating video component is proportional to the distance of the objects 35 and 36 as shown 34, and, therefore, a measure of such phase difference, obtained with phase detector 37, is a measure of their relative depth. The output voltage of phase detector 37 is added to or subtracted from the conventional sawtooth deflection voltage generated in generator 38 to produce a relative shift of objects 35 and 36 on the face of the CRT 39. When sawtooth and phase signals are added, objects 35 and 36 are imaged closer together and when subtracted they are shifted apart. When these images are presented to each eye by conventional means, stereoscopic depth sensation arises. Means such as previously described may be used to present separate images to each eye.

FIG. 4 describes a preferred embodiment of the present invention for television, teleoperation, or machine vision by which every pixel in the image has a corresponding digital range (depth) value as a result of phase detection with improved means.

Light source 41 is modulated with a periodical waveform by modulator 42 at frequency f. The image sensor in video camera 43 is shuttered on and off at the same frequency f, in synchrony and in phase with the light source for a video frame period. In this way, during half of the frame time, no light is collected and a digital image is formed and stored (44) from light received during the "on" time only. During the next frame, the on-off cycles are reversed so that they are in synchrony with the light source, but in opposed phase. A second and different digital image is temporarily stored in buffer 45.

Energy collected for an arbitrary pixel of buffer 44 is schematically depicted as 44A, while energy collected for the same pixel in buffer 45 is illustrated as 45A. The digital value for that pixel will be the total area of 44A (for buffer 44) or 45A (for buffer image 45) integrated during a frame time (1/60's for American TV).

The addition (pixel by pixel) of buffers 44 and 45 results in buffer 46 which contains a conventional image of the scene. The subtraction of buffers 44 and 45 results in buffer 47 containing phase information. It can be seen that the result of substracting total light energy for the same pixel in alternate frames (black areas of waveforms 44A and 45A) is clearly dependent on the time when switching occurs, and therefore the phase. Range (distance) is obtained at buffer 48 as phase measurement by dividing relative phase from buffer 47 by amplitude from buffer 46. Depending on the phase (distance) of the imaged pixel, the range measurement will vary between the values −1 and +1 for each pixel.

This invention is not limited to the energy sources or to the applications described above, but it can be used with other types of energy such as electromagnetic radiation, including light and infrared, sound, ultrasound, x-rays, etc., and in any propagation media, such as, but not limited to, air, water, space, soil, biological tissue, etc. This invention can therefore be used for multiple imaging applications, such as, but not limited to, broadcast and close circuit TV, land and air radar, sonar, depth sounders, ultrasonic medical imaging, and automated vision machines.

This invention, as opposed to conventional stereoscopic recording, offers the advantage of stereo effect independent of how far the objects are located, since the disparity angle is constant as shown above.

What is claimed is:

1. A three dimensional display system comprising:
   means for emitting a beam of energy in the form of a series of scans with each scan falling into one of at least two groups having characteristics distinguishing one from the other;
   detector means for detecting said beam of energy when reflected from objects during said scanning; and
   means for separating and segregating said reflected energy by said distinguishing characteristics for segregated display of different groups of each eye of a viewer to create a stereoscopic image.

2. A three dimensional display system as set forth in claim 1 wherein said means for emitting a beam of energy includes means for defining one group from the other in accordance with the direction of scanning of said beam.

3. A three dimensional display system as described in claim 2 wherein said means for emitting a beam of energy includes means for reciprocally scanning said beam in opposite directions.

4. A three dimensional display system as set forth in claim 3 wherein said means for emitting a beam of energy also provides a raster-like scan, wherein said object is scanned by the beam alternately in one direction and then the opposite direction as the successive lines of scan are parallely displaced.

5. A three dimensional display system as set forth in claim 4 wherein said means for emitting a beam of energy includes a laser.

6. A three dimensional display system as set forth in claim 4 wherein said means for emitting a beam of energy includes a microwave emitting antenna.

7. A three dimensional display system as set forth in claim 4 wherein said means for emitting a beam of energy includes a sonic or ultrasonic source.

8. A three dimensional display system comprising:
   means for emitting a uniform beam of energy whose intensity varies periodically,
   detector means for detecting said periodically varying energy when reflected from objects,
   means for extracting phase information related to distance of object from said detected energy,
   means for electronically combining said phase signal with deflection signals of a video display resulting in at least two deflection signals distinguished one from the other according to the proportion that said phase signals are added or subtracted, and
   means for separating and segregating said reflected energy by said distinguished characteristics for segregated display of different groups of each eye of a viewer fo create a stereoscopic image.

9. A three dimensional display system as set forth in claim 8 wherein means for emitting a beam of energy includes means for defining one group from the other in accordance with the velocity of said scanning.

10. A three dimensional display system as set forth in claim 8 where said means for extracting phase information related to distance includes:
   a shuttered imaging device through which said reflected energy passes,
   means for segregating said reflected energy as pixel energy values in syncrony with variations in said periodically varying beam, and
   means for varying said pixel values with said phase information.

* * * * *